United States Patent
Graboski

(10) Patent No.: US 8,615,954 B1
(45) Date of Patent: Dec. 31, 2013

(54) RIDGE TILE OR SOLAR PANEL ATTACHMENT SYSTEM FOR A ROOF

(76) Inventor: Timothy Michael Graboski, Pompano Beach, FL (US)

( * ) Notice: Subject to any disclaimer, the term of this patent is extended or adjusted under 35 U.S.C. 154(b) by 0 days.

(21) Appl. No.: 13/361,692

(22) Filed: Jan. 30, 2012

Related U.S. Application Data

(63) Continuation-in-part of application No. 12/643,086, filed on Dec. 21, 2009, now Pat. No. 8,104,231.

(51) Int. Cl.
  *E04B 2/08* (2006.01)
  *E04B 2/00* (2006.01)
  *E04B 9/00* (2006.01)
  *E04F 13/04* (2006.01)

(52) U.S. Cl.
  USPC ............................ 52/589.1; 52/590.2; 52/443

(58) Field of Classification Search
  USPC ......... 52/589.1, 590.1, 590.2, 27, 443, 126.6, 52/198, 199, 173.3; 248/237, 148, 205.3, 248/220.21, 220.22, 223.41, 225.11; 454/364, 365; 126/621, 622, 623
  See application file for complete search history.

(56) References Cited

U.S. PATENT DOCUMENTS

| 4,011,704 | A | * | 3/1977 | O'Konski | 52/481.1 |
| 4,558,637 | A | | 12/1985 | Mason | |
| 4,685,265 | A | | 8/1987 | Cooper | |
| 5,651,226 | A | * | 7/1997 | Archibald | 52/518 |
| 6,647,675 | B1 | | 11/2003 | Castellanos | |
| 6,773,341 | B2 | | 8/2004 | Cedergreen et al. | |
| 6,966,156 | B2 | | 11/2005 | Dixon | |
| 7,485,034 | B2 | | 2/2009 | Sells | |
| 7,739,840 | B1 | * | 6/2010 | Castellanos | 52/57 |
| 7,774,990 | B1 | * | 8/2010 | Castellanos | 52/57 |
| 8,104,231 | B1 | * | 1/2012 | Graboski | 52/41 |
| 2006/0223436 | A1 | | 10/2006 | Matyja | |
| 2007/0094948 | A1 | | 5/2007 | Osborne et al. | |
| 2008/0256887 | A1 | | 10/2008 | Exposito | |
| 2009/0163134 | A1 | | 6/2009 | Peck | |

FOREIGN PATENT DOCUMENTS

| JP | 02000154619 | 6/2000 |
| JP | 02008208618 | 9/2008 |

* cited by examiner

*Primary Examiner* — Andrew Triggs
(74) *Attorney, Agent, or Firm* — GableGotwals

(57) ABSTRACT

An improved solar panel attachment system for a roof and method for its use include a pedestal that has a plurality of protrusions and keyways located along its bottom wall surface and extending along the length of the pedestal. The pedestal is placed into a paddy of foam adhesive laid along a roof underlayment and the keyways receive and engage with the expanding adhesive for bonding the pedestal directly to the roof without the need for mechanical fastening. The protrusions provide spacing between the bottom wall surface and the roof so that an adequate amount of foam adhesive resides between these wall surfaces and those structures. Attaching means are secured to the top wall surface so that the pedestal may be used to securely mount (or secure) a solar panel or other object to a roof.

12 Claims, 6 Drawing Sheets

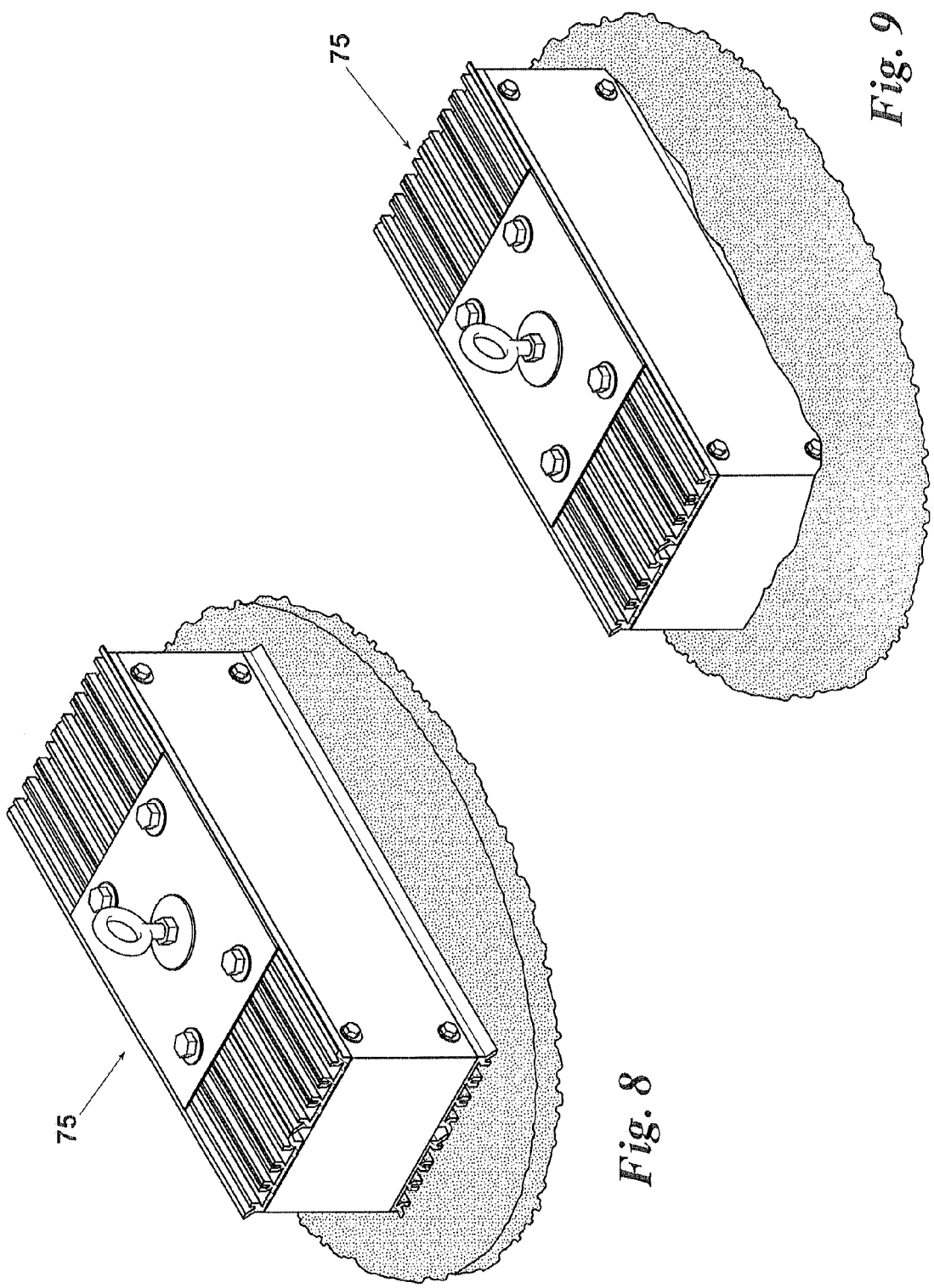

RIDGE TILE OR SOLAR PANEL ATTACHMENT SYSTEM FOR A ROOF

CROSS-REFERENCE TO CO-PENDING APPLICATIONS

This application is a continuation-in-part of U.S. patent application Ser. No. 12/643,086 and claims the benefit of that application.

BACKGROUND OF THE INVENTION

This invention relates generally to hip and ridge attachment systems for roofing materials and, more particularly, to attachment systems for cap or trim roof tiles, field tiles, and other roof products such as solar components in high wind environments.

In August 1992, one of the most devastating hurricanes in U.S. history, category 5 Hurricane Andrew, made landfall. The aftermath was devastating. Andrew caused more than $40 billion in property damage and 90% of Dade County, Florida homes suffered major roof damage. At that time, the common and approved building practice for tiled roofs was to set a trim, cap or ridge tile with cement mortar and secure it to a field tile, thereby making the field tile the primary point of contact to the roof for the ridge tile.

To ensure that this extensive amount of wind damage would never happen again, Dade County created new building codes. In regards to attachment systems for ridge roof tiles, the solution was to anchor wood or galvanized steel to the roof and then use an adhesive to better secure the ridge tiles to the wood or steel. Unlike the prior system, the primary point of contact for the ridge tile became the wood or steel that was secured to the roof rather than the field tile. In regards to solar panels, wood or galvanized steel is attached to the roof and then used to support and anchor the panels to the roof.

However, the problem with both wood and galvanized steel systems is that in order to properly anchor the system to the roof it must be nailed to the roof, using two nails every six inches. This amount of nailing causes a lot of penetration through the roof underlayment and decking, thereby providing a leak pathway through the underlayment and decking. Furthermore, wood is heavy, it warps, and it rots over time. Galvanized steel is easily dented, has sharp edges, and is known to rust. Therefore, a need exists for an attachment system for ridge roof tiles or solar panels in high wind environments that provides a better primary contact to the roof, is lightweight, eliminates penetration and is easy to install, resists rot and corrosion, and provides superior performance in comparison to existing wood and galvanized steel systems.

SUMMARY OF THE INVENTION

An improved roof ridge apparatus made according to this invention includes a longitudinally extending rigid member with an optional central passageway and a plurality of protrusions extending away from a portion of its top and bottom wall surfaces. The protrusions provide spacing between the bottom wall surface and a roof and between the top wall surface and a roof tile so that an adequate amount of foam adhesive resides between these wall surfaces and those structures. The protrusions have keyways at their upper end that provide additional surface area for bonding to the adhesive. As the foam adhesive expands it surrounds the protrusions and enters into the keyways. Once the adhesive cures, the rigid member is securely affixed to the roof without the need for mechanical fasteners and the roof tile is securely affixed to the rigid member. Preferably, the rigid member is an extruded olefin-based polymer member.

A method for installing the roof ridge apparatus to a roof includes the steps of applying a foam adhesive to a roof underlayment and positioning the longitudinally extending rigid member onto the foam adhesive. Foam adhesive is applied to the top surface of the positioned rigid member and a trim tile is positioned over the top surface. Prior to installing the trim tile, weather block may be applied to the field tile located alongside the positioned rigid member.

An improved apparatus and system for mounting a solar panel above a roof includes a pedestal with a plurality of protrusions that extend along and away from the bottom wall surface of the pedestal. At least one protrusion defines at least one keyway within that protrusion that can receive an adhesive for securing the pedestal to the roof. The pedestal also has a top wall surface with means for attaching the solar panel. The top wall surface may be partially or entirely defined by the attaching means.

A method for mounting a solar panel above a roof includes the steps of applying a foam adhesive to the roof and positioning a pedestal having keyways onto the foam adhesive. A solar panel is then positioned over and secured to the top wall surface of the pedestal.

BRIEF DESCRIPTION OF THE DRAWINGS

FIG. 8 illustrates the step of positioning the pedestal of FIG. 6 and placing or embedding the keyways of the bottom wall surface into the foam adhesive.

FIG. 9 is an isometric view of the pedestal of FIG. 6 after it has been set into place by the foam adhesive.

DETAILED DESCRIPTION OF THE PREFERRED EMBODIMENTS

Figure 1:
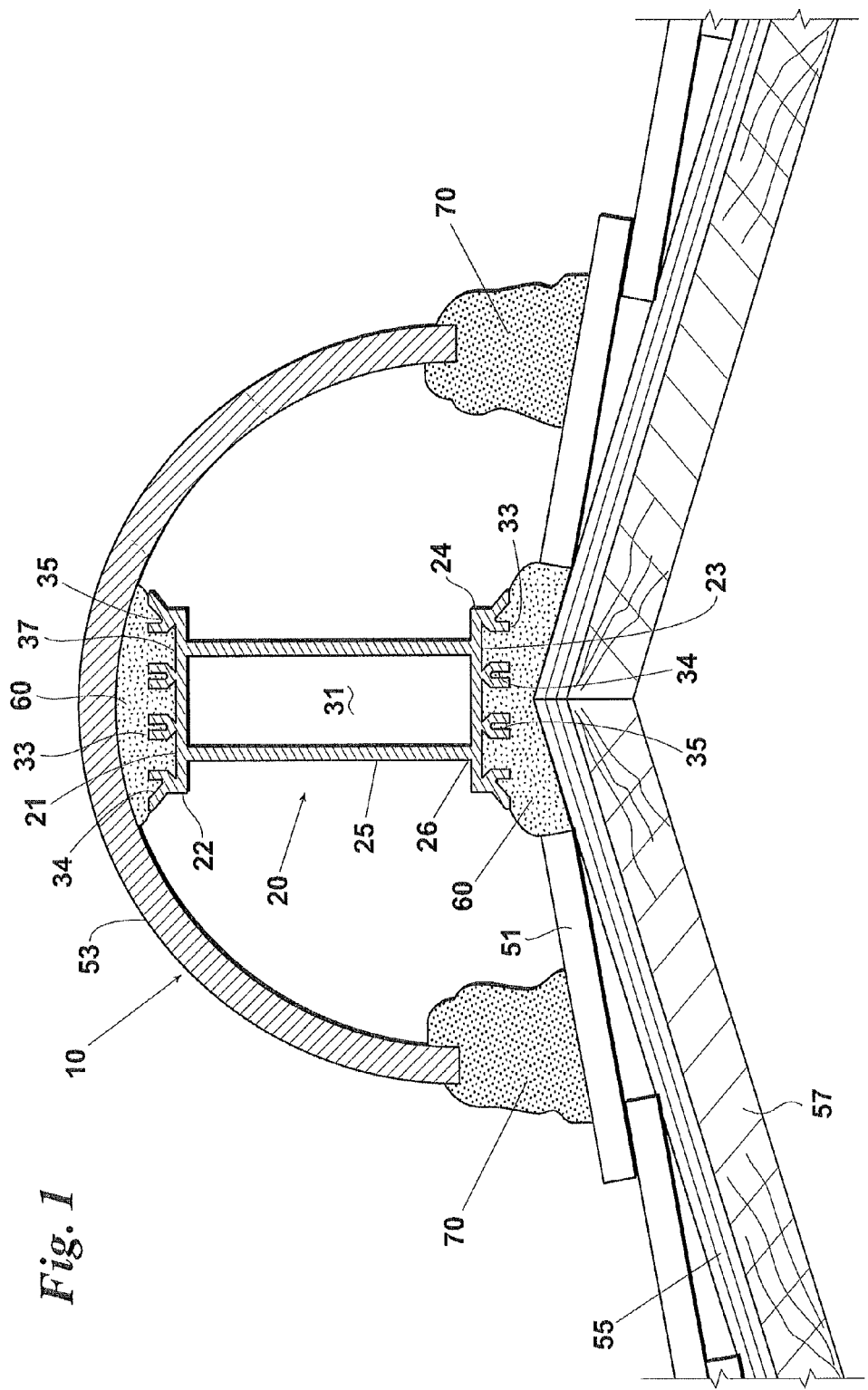
FIG. 1 is a cross-sectional view of an improved roof ridge system made according to this invention. A longitudinally extending rigid member having keyways along at its top and bottom wall is received by a continuous strip paddy of foam adhesive that has been applied to a roof underlayment. A trim tile is then received by a paddy of foam adhesive that has been applied to the top wall of the rigid member.

Preferred embodiments of an improved ridge tile system for a roof will now be described by making reference to the drawings and the following elements illustrated in the drawings:

| | |
|---|---|
| 10 | Ridge tile system |
| 20 | Rigid member |
| 21 | Top wall |
| 22 | End of 21 |
| 23 | Bottom wall |
| 24 | End of 23 |
| 25 | Side wall |
| 26 | End of 25 |
| 31 | Compartment or passageway |
| 33 | Protrusion |
| 34 | Wall surfaces of 33 |
| 35 | Keyway |
| 37 | Groove or track |
| 51 | Field tile |
| 53 | Trim tile |
| 55 | Underlayment |
| 57 | Decking |
| 60 | Foam adhesive |
| 70 | Weather block |

Referring to the drawings and first to FIG. 1, a ridge tile system 10 includes a longitudinally extending rigid member 20 having a top wall 21, a bottom wall 23, and side walls 25. Side walls 25 provide the desired height to rigid member 20 and may be arranged perpendicular to walls 21, 23. Alternatively, the walls 25 may be arranged in some other orientation including but not limited to a cross-, web-, triangle-, or circle-shaped design. The ends 26 of walls 25 may be offset relative to the ends 22, 24 of walls 21, 23 or set flush with ends 22, 24. Rigid member 20 is preferably a 2 inch×4 inch rigid member but can be made in different width and height combinations.

Preferably, rigid member 20 is extruded in 10-foot lengths using an olefin-based polymer and has a central passageway 31 extending along its length. (Shorter or longer lengths may be extruded.) Central passageway 31 allows rigid member 20 to house wiring, cabling or other roofing products (not shown) or to receive an insulating or other type of material. Central passageway 31 may be divided into two or more passageways. The passageway 31 may also be partially filled or completely eliminated, with side walls 25 forming a solid side wall 25.

Top and bottom walls 21, 23 include one or more protrusions 33 extending away from the respective wall 21, 23. Each protrusion 33 includes a keyway 35. The keyways 35 are designed to receive a foam adhesive 60 and provide additional surface area for bonding with adhesive 60. POLYPRO® AH-160 Roof Tile Adhesive (Polyfoam Products, Inc., Tomball, Tex.) is a suitable adhesive for use as adhesive 60. In a preferred embodiment, each keyway 35 is formed by the opposing inner wall surfaces 34 of each protrusion 33. Alternatively, two adjacent protrusions 33 could be spaced and arranged relative to one another so as to effectively form a keyway 35 having a desired shape between the two protrusions 33.

In a preferred embodiment, top and bottom walls 21, 23 include four equally spaced protrusions 31 having keyways 35 and forming three grooves or tracks 37. Each of the two middle protrusions 31 is a symmetrical U-shaped protrusion having a slotted keyway 35. Each of the two outer protrusions is asymmetrical Y-shaped protrusions having a wedge-shaped keyway 35. A portion of these outer protrusions 31 extend beyond the end 22, 24 of its respective top or bottom wall 21, 23 respectively. Each protrusion 31 and keyway 35 is analogous to an arm and receiver combination.

Figure 2:
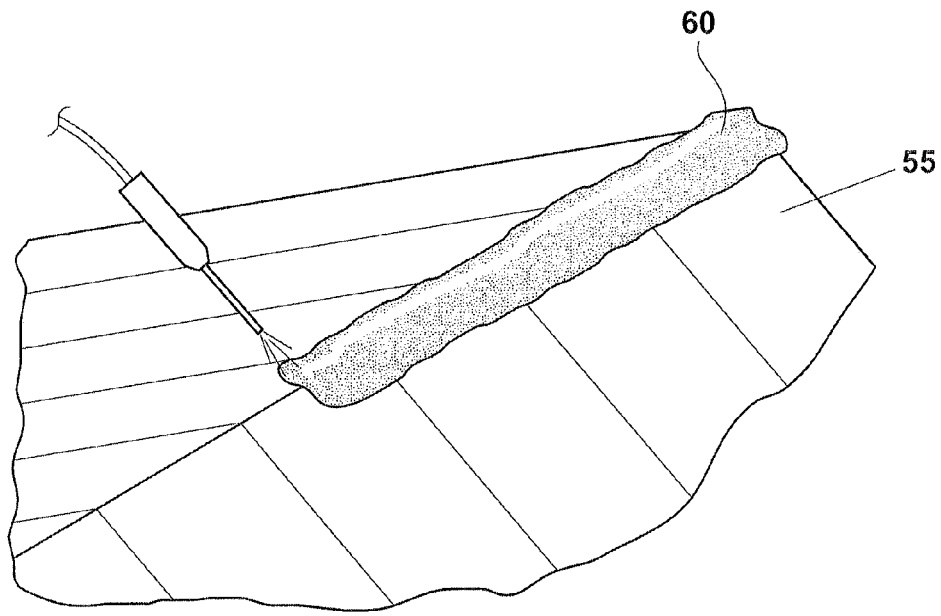
FIG. 2 illustrates the step of applying the foam adhesive to the roof underlayment located at a ridge or field roof portion of a roof prior to positioning the rigid member of FIG. 1.
Figure 3:
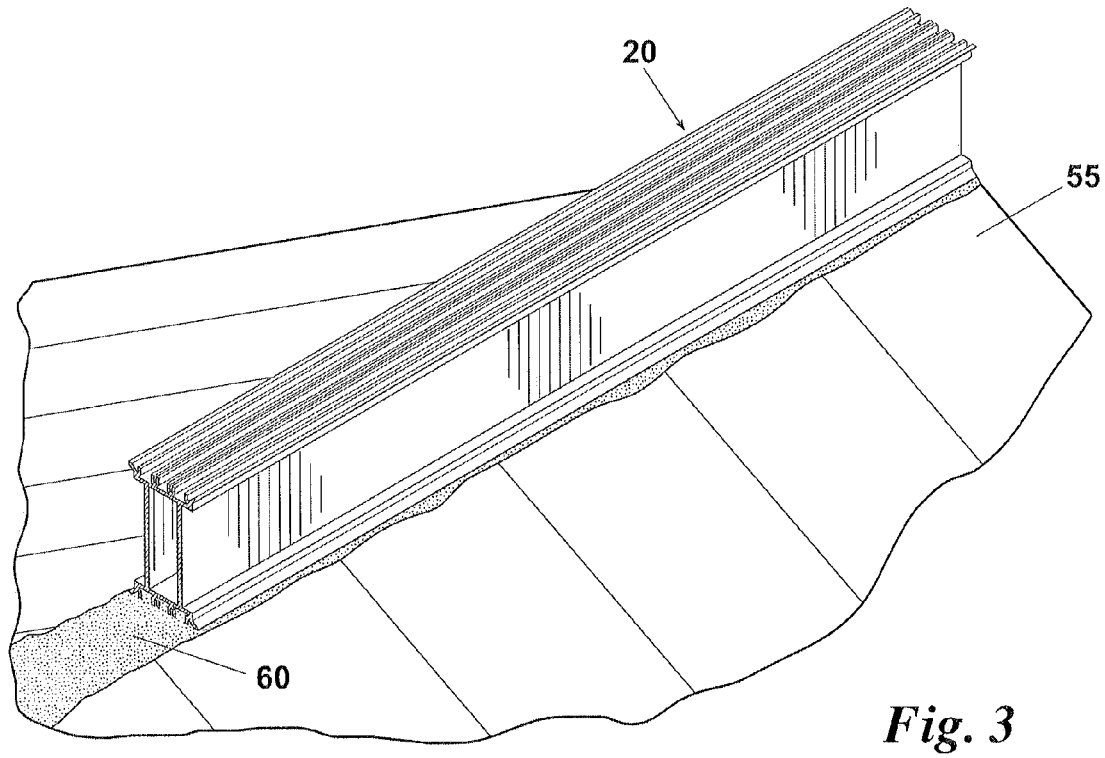
FIG. 3 illustrates the step of positioning the rigid member of FIG. 1 and placing or embedding the keyways of the bottom wall into the foam adhesive.

Using the keyways 35 on bottom wall 23 as an example—and referring also to FIGS. 2 & 3—a continuous strip paddy of uncured adhesive 60 is applied to the roof underlayment 55 located at a ridge or field tile portion of a roof prior. Rigid member 20 is then placed on or pressed into the adhesive 60. The adhesive 60 expands into the keyways 35 of bottom wall 23, surrounds the protrusions 33 of the wall 23, and enters tracks 35 formed by adjacent protrusions 33. As adhesive 60 finishes expanding and cures, adhesive 60 mechanically bonds with the keyways 35, protrusions 33, and tracks 37 and locks rigid member 20 into place. The height of the protrusions 33 provides the desired, minimum amount spacing between the wall 23 and the underlayment 55. The protrusions 33 therefore help ensure that an adequate amount of adhesive 60 resides between the wall 23 and the underlayment 55 for proper bonding of one to the other. As a result of the above, rigid member 20 is firmly secured to the roof underlayment 55. No penetration of the underlayment 55 or decking 57 takes place (see FIG. 1).

Figure 4:
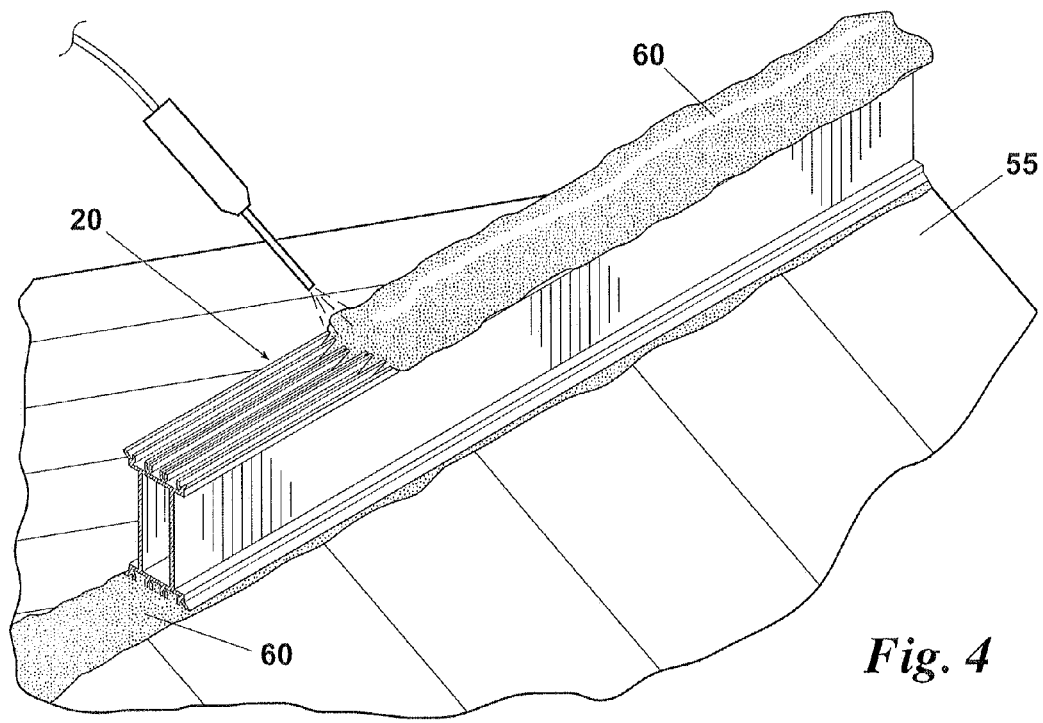
FIG. 4 illustrates the step of applying a continuous strip paddy of foam adhesive to the top wall of the rigid member of FIG. 3.
Figure 5:
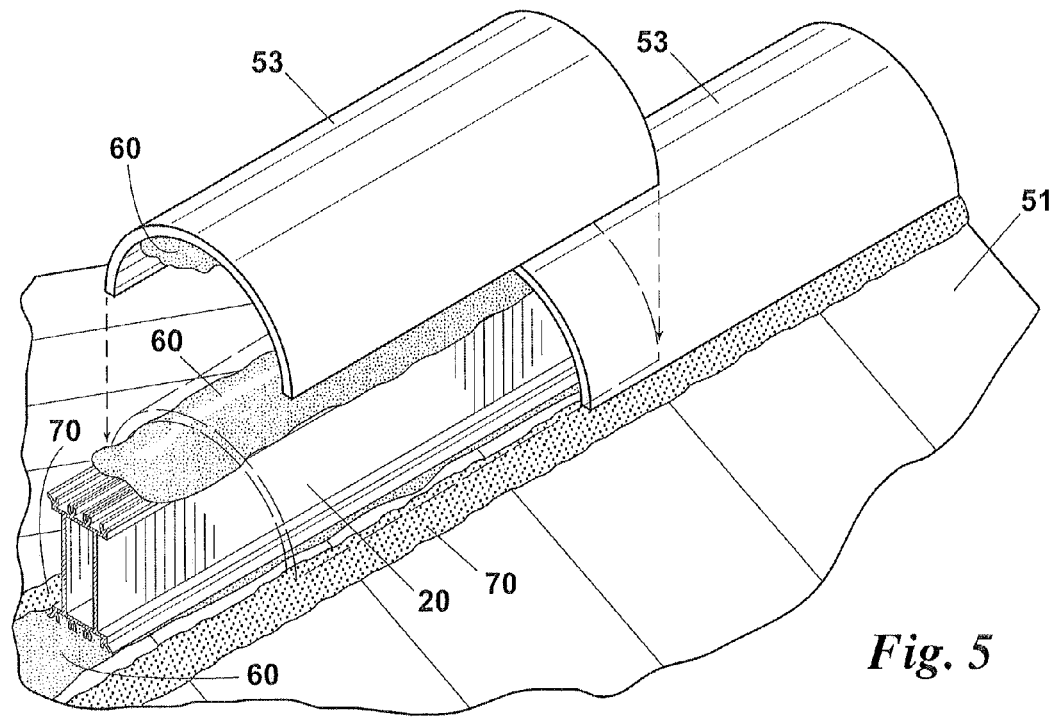
FIG. 5 illustrates the steps of applying optional weather block to the field tiles located on both sides of the positioned rigid member of FIG. 4 and positioning a trim tile over the top wall of the member. A paddy of foam adhesive is also preferably applied to the underside of the trim tile.

Referring now to FIGS. 1, 4 & 5, a continuous paddy of adhesive 60 is applied to top wall 21 of the positioned rigid member 20. Adhesive 60 expands into the keyways 35, surrounds the protrusions 33 and enters tracks 35 of top wall 21. A continuous paddy of optional weather block 70 is then laid down on the field tiles 53 located on opposing sides of positioned rigid member 20. Trim tiles 53 are then positioned over the top wall 21, each trim tile 53 being received by the adhesive 60 and the weather block 70 (if used). Field and trim tiles 51, 53 are of a type well known in the art. A paddy of adhesive 60 may also be applied to the underside of each trim tile 53 prior to its placement onto positioned rigid member 20. Adhesive 60 cures and mechanically bonds and locks in the trim tiles 53 to the top wall 21. As with the bottom wall 23, the height of the protrusions 33 on the top wall 21 provides the desired amount of spacing between the wall 21 and the trim tile 53 and helps ensure that enough adhesive 60 resides between the wall 21 and the trim tile 53 for proper bonding of one to the other.

Preferred embodiments of a system for mounting solar panels above a roof will now be described by making reference to the drawings and the following elements illustrated in the drawings:

| | |
|---|---|
| 75 | System |
| 80 | Pedestal |
| 81 | Top wall |
| 83 | Bottom wall |
| 85 | Side wall |
| 90 | Protrusion |
| 95 | Keyway |
| 97 | Flat surface or plate of attaching means |
| 99 | Receiver of attaching means |
| 100 | Solar panel |

Figure 6:
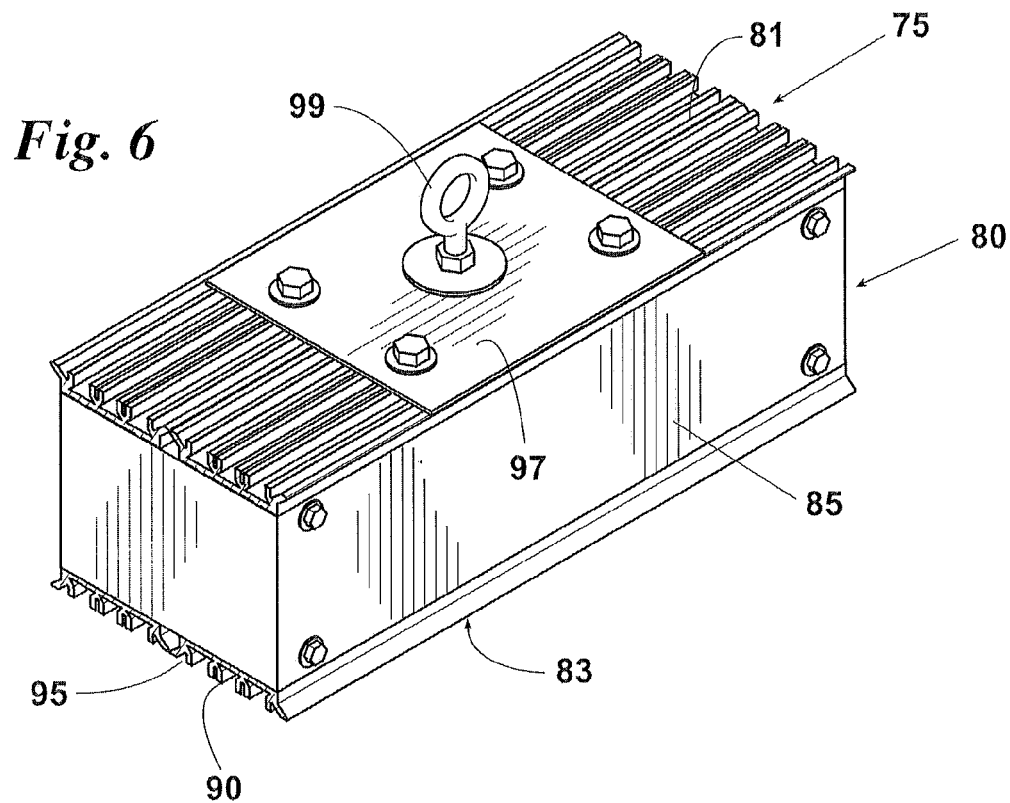
FIG. 6 is an isometric view of an improved apparatus for mounting a solar panel above a roof according to this invention. A pedestal having keyways along its bottom wall surface is received by a paddy of foam adhesive that has been applied to the roof. A solar panel is then attached to the pedestal by means on the top wall surface of the pedestal.

Referring to FIG. 6, a system 75 for mounting a solar panel above a roof includes a pedestal 80 having a top wall 81, a bottom wall 83, and side walls 85. Side walls 85 provide the desired height for the pedestal 80 and may be arranged perpendicular to the top and bottom walls 81, 83. The pedestal 80 may be configured as a rectangle, square, or other shape. The dimensions of pedestal 80 may vary depending upon the characteristics of the solar panel (or other object being mounted to pedestal 80) and the surface to which the solar panel (or object) is to be mounted or secured.

The surface of the bottom wall 83 of the pedestal 80 includes one or more protrusions 90 extending away from the bottom wall 83. Each protrusion 90 includes a keyway 95 within it, which is designed to receive a foam adhesive 60 and provide additional surface area for bonding with adhesive 60. In a preferred embodiment, each keyway 95 is formed by the opposing inner wall surfaces of each protrusion 90. Alternatively, two adjacent protrusions 90 could be spaced and arranged relative to one another so as to effectively form a keyway 95 having a desired shape between the two protrusions 90. The surface of the top wall 81 of the pedestal 80 may have a similar series of protrusions 90 and keyways 95. The surface of the top wall 81 also includes means for mounting and securing a solar panel to the pedestal 80. Such means may include a flat surface or plate 97 and a receiver 99 such as eye-bolts or supports extending away from the flat surface which receive a portion of the solar panel and through which fasteners can be passed. The top wall 81 may be defined in part (or entirely by) the flat surface or plate 97. In other words, the top wall 81 does not include protrusions 90 or keyways 95.

Figure 7:
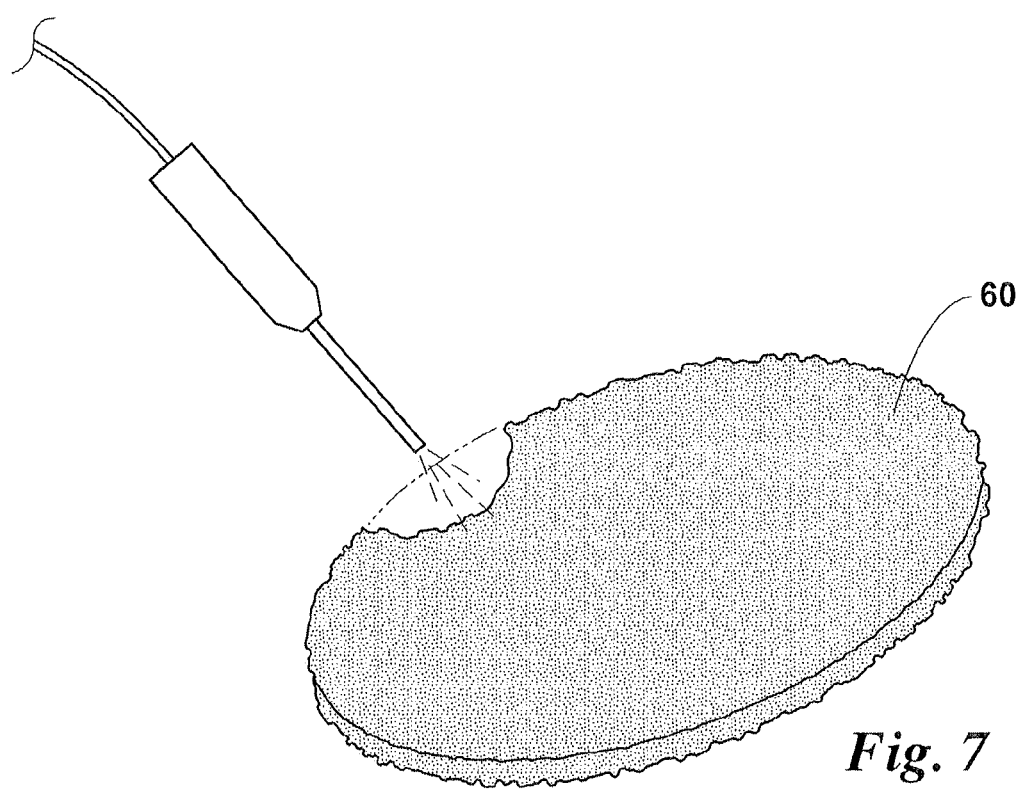
FIG. 7 illustrates the step of applying the foam adhesive to the roof prior to positioning the pedestal of FIG. 6.
Figure 10:
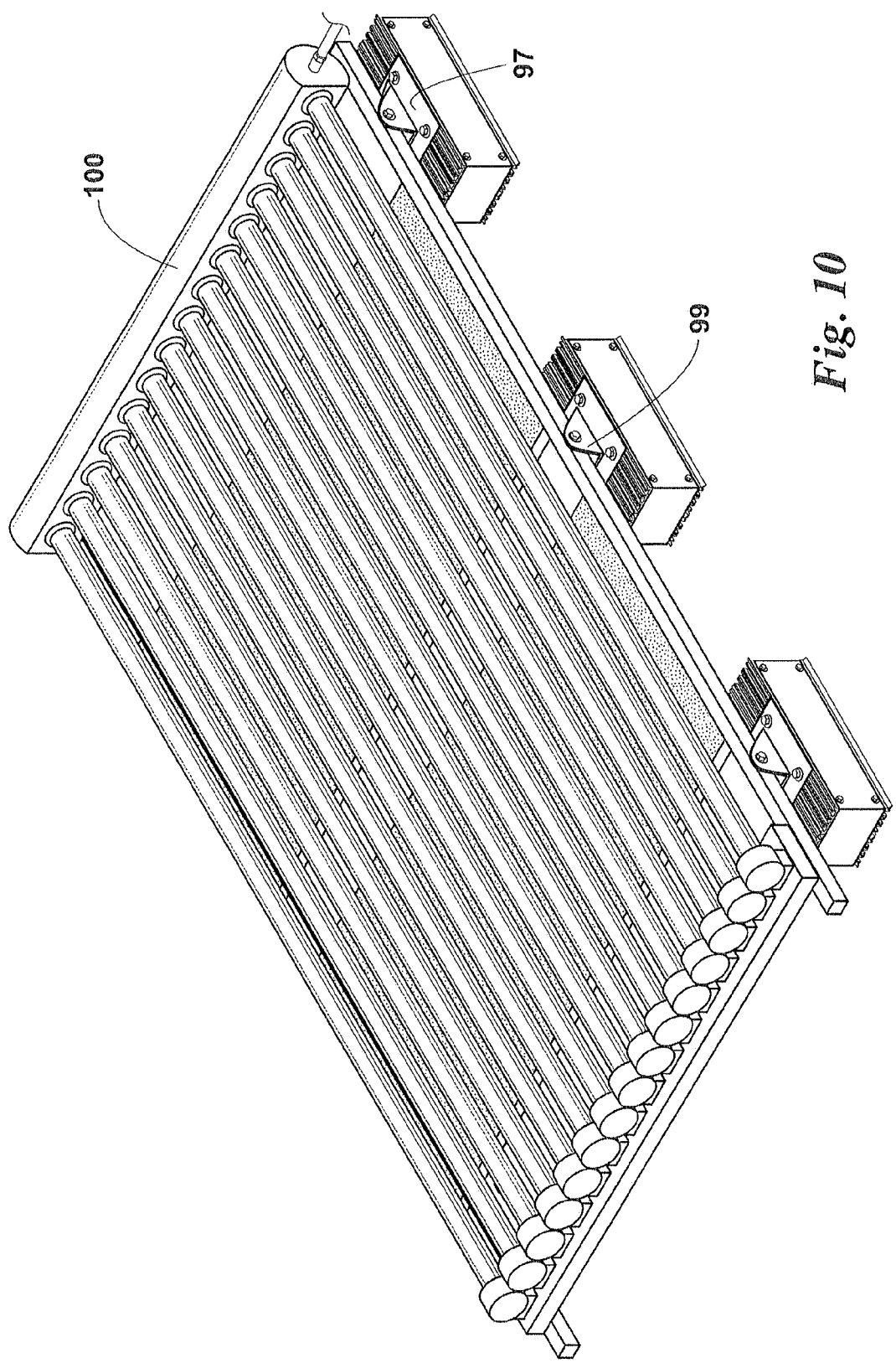
FIG. 10 is an isometric view of the pedestal of FIG. 6 showing the solar panel attached to the top wall surface of the pedestal.

Referring to FIGS. 7 through 9, a paddy of uncured foam adhesive 60 is applied to the roof at the location where the pedestal 80 is to be positioned. The pedestal 80 is then placed on and pressed into the adhesive 60. The adhesive 60 expands into the keyways 95 and surrounds the protrusions 90 along the surface of the bottom wall 83 of the pedestal 80. As the adhesive 60 finishes expanding and cures, it mechanically bonds with the keyways 95 and protrusions 90, securely locking the pedestal 80 into place. The height of the protrusions 90 and the pedestal 80 provide the desired minimum amount of spacing between the roof and the solar panel. The protrusions 90 also help ensure that the amount of adhesive 60 used is adequate to properly bond the pedestal 80 to the roof. Finally, as shown in FIG. 10, the solar panel 100 is positioned over the pedestal 80 and attached to the surface of the top wall 81 of the pedestal 80. Different types, numbers, and configurations of pedestals may be used depending upon the specific characteristics of the solar panel installation at a given site.

While a ridge tile or solar panel attachment system and method for its use have been described with a certain degree of particularity, many changes may be made in the details of construction and the arrangement of components without departing from the spirit and scope of this disclosure. A system and method according to this disclosure, therefore, is limited only by the scope of the attached claims, including the full range of equivalency to which each element thereof is entitled.

What is claimed is:

1. An apparatus for mounting or securing a piece of roof-mounted equipment above a roof, the apparatus comprising:
   a pedestal having a top wall surface and a bottom wall surface spaced apart from one another by a side wall surface;
   a plurality of protrusions extending along and away from a portion of said bottom wall surface;
   one or more protrusions including a keyway, said keyway capable of receiving an adhesive for securing said pedestal to a roof; and
   means on said top wall surface for attaching a piece of roof-mounted equipment to said pedestal.

2. An apparatus according to claim 1 further comprising said protrusions providing space between said bottom wall surface and the roof so that an adhesive for bonding said pedestal to the roof resides between said bottom wall surface and the roof.

3. An apparatus according to claim 1 wherein said keyway lies between opposing wall surfaces of one protrusion in said plurality of protrusions.

4. An apparatus according to claim 1 wherein said attaching means forms a portion of said top wall surface.

5. An apparatus according to claim 1 wherein the pedestal is secured to the roof without means for penetrating a roof decking.

6. An apparatus according to claim 1 wherein the pedestal is a plastic member.

7. An apparatus according to claim 1 wherein the roof-mounted equipment is a solar panel.

8. An apparatus according to claim 1 wherein the top wall surface is a top wall of the pedestal and the bottom wall surface is a bottom wall of the pedestal.

9. An apparatus according to claim 1 wherein the keyway is located at an upper end of the protrusion.

10. An apparatus according to claim 1 wherein the attaching means is a plurality of protrusions extending along and away from a portion of said top wall surface, one or more protrusions including a keyway capable of receiving an adhesive.

11. An apparatus according to claim 10 wherein said keyway lies between opposing wall surfaces of one protrusion in said plurality of protrusions.

12. An apparatus according to claim 10 wherein the keyway is located at an upper end of one protrusion in said plurality of protrusions.

* * * * *